Figure 1:
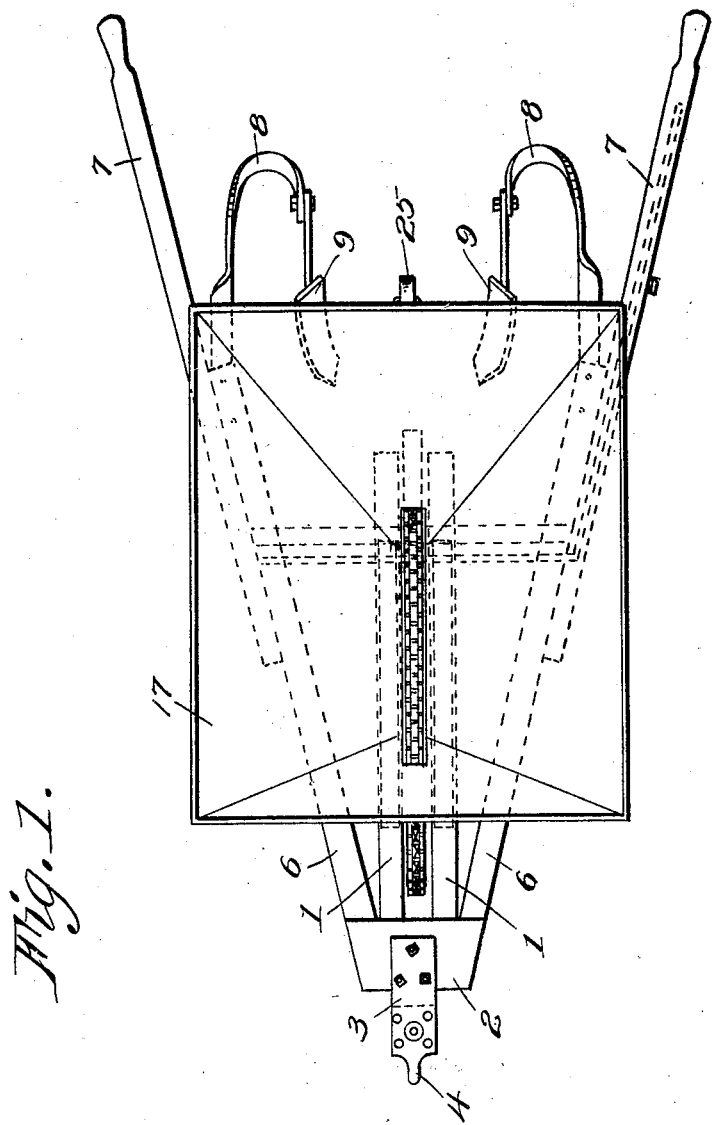

O. LEWIS.
FERTILIZER DISTRIBUTER.
APPLICATION FILED NOV. 12, 1908.

924,477.

Patented June 8, 1909.
2 SHEETS—SHEET 1.

Witnesses
F. C. Gibson.

Inventor
Olin Lewis,
By Victor J. Evans
Attorney

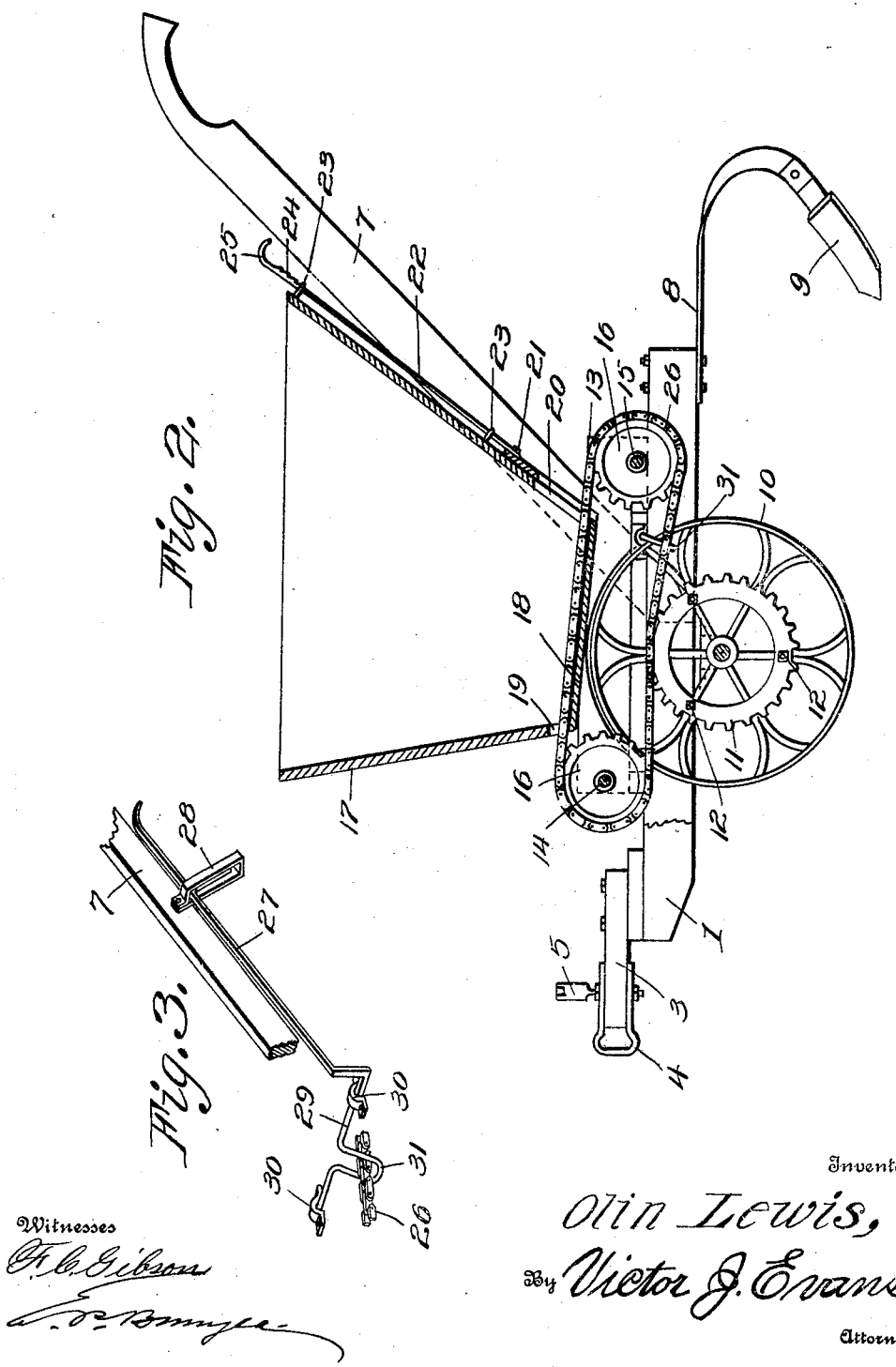

UNITED STATES PATENT OFFICE.

OLIN LEWIS, OF GALIVANTS FERRY, SOUTH CAROLINA.

FERTILIZER-DISTRIBUTER.

No. 924,477.  Specification of Letters Patent.  Patented June 8, 1909.

Application filed November 12, 1908. Serial No. 462,287.

*To all whom it may concern:*

Be it known that I, OLIN LEWIS, a citizen of the United States of America, residing at Galivants Ferry, in the county of Horry and State of South Carolina, have invented new and useful Improvements in Fertilizer-Distributers, of which the following is a specification.

This invention relates to fertilizer distributers, and one of the principal objects of the same is to provide a simple, reliable and efficient device for uniformly distributing guano or other fertilizing material of similar character.

Another object of the invention is to provide means whereby a drive chain is constantly moved across the bottom inside the hopper in order to carry a uniform quantity of the fertilizer out through the feed opening of said hopper, means being provided for regulating the flow, and means also being provided for disconnecting the drive chain from its sprocket wheel in order that the machine may be conveyed from place to place after discharging the fertilizer.

These and other objects may be attained by means of the construction illustrated in the accompanying drawings, in which,—

Figure 1 is a top plan view of a fertilizer distributer made in accordance with my invention. Fig. 2 is a central longitudinal section of the same. Fig. 3 is a detail perspective view illustrating the means for disconnecting the drive chain from the sprocket wheel to render the feeding mechanism inoperative.

Referring to the drawing, the numeral 1 designates the beam consisting of parallel members connected together at their front ends by means of a cross bar or block 2 having a draft bar 3 secured thereto and a clevis 4 connected to said draft bar. The bolt for securing the clevis in place on the bar 3 is provided with a wrench head 5. Connected to the cross bar or block 2 are the diverging members 6 to which in the rear the handles 7 are connected. Secured to the rear ends of the members 6 are the standards 8 to which the coverer blades 9 are secured.

The centrally disposed ground wheels 10 are spaced apart and provided with an axle journaled in hangers depending from the beams 1. Between the wheels 10 is a sprocket wheel 11 secured by bolts 12 to the spokes of the wheels. Mounted upon the beams is a frame 13 in which is journaled the shafts 14 and 15, each shaft carrying a sprocket wheel 16 preferably of the same diameter. Mounted upon the frame 13 is a box or hopper 17, the walls of which converge toward the bottom 18. Formed in the front wall of the hopper is an opening 19, and the rear wall is provided with a feed opening 20 having a sliding regulator door 21 fitted in guides at the sides of said opening and provided with an adjusting lever 22, the latter extending through keepers 23 and provided with rack teeth 24 for holding the regulator in adjusted position, a handle 25 being formed upon the end of the lever. A drive chain 26 passing around the sprocket wheels 16 and through the hopper serves to deposit a uniform quantity of the fertilizer upon the ground during the operation of the machine, said drive chain being actuated by the sprocket wheel 11.

In order that the sprocket chain 26 may be disconnected from the sprocket wheel 11 to prevent the feeding of the machine I have provided a lever 27 mounted in a rack 28 depending from one of the handles 7, said lever at its lower end being provided with a shaft 29 mounted in keepers 30, said shaft having an offset portion or loop 31 which extends underneath the drive chain 26. When the lever 27 is depressed the drive chain 26 is lifted until it disengages the sprocket wheel 11.

The operation of my invention may be briefly described as follows:—As the machine is drawn over the ground the drive chain 26 moves through the bottom of the hopper and drops a uniform quantity of fertilizer which may be regulated by means of the lever 22 and the sliding door 21. The coverers 9 follow the distribution of fertilizer to throw the dirt over the fertilizer. Whenever it is desired to convey the machine from place to place without feeding the fertilizer, the lever 21 is operated to raise the lower stretch of the drive chain 26 from the teeth of the sprocket wheel 11.

My invention is of simple construction, can be manufactured at low cost, is efficient in operation, is composed of few parts which cannot readily get out of order and is light of draft.

I claim:—

1. A fertilizer distributer comprising a frame, a hopper mounted on said frame and provided with openings in the front and rear walls thereof, a sliding door mounted for adjustment upon the rear wall of said hopper, a pair of sprocket wheels mounted in the frame, a drive chain passing around said sprocket wheels and extending through said hopper for feeding the fertilizing material, ground wheels, a sprocket wheel secured to the axle of said ground wheels to actuate said drive chain, and means for disconnecting said drive chain from said sprocket wheel.

2. A fertilizer distributer comprising a frame, ground wheels mounted in said frame, a sprocket wheel connected to said ground wheels, a hopper, sprocket wheels mounted underneath the hopper, a drive chain passing around said sprocket wheels and through the hopper, means for regulating the feed, and means for disconnecting said drive chain from the main sprocket wheel.

3. In a fertilizer distributer, the combination of a hopper provided with a feed opening, means for regulating the feed, a drive chain extending through the hopper for carrying the fertilizer through said opening, means connected to the ground wheels for actuating said drive chain, and means for disconnecting said drive chain from the driving means.

4. In a machine of the character described, the combination of a hopper, a drive chain extending through the hopper to feed the fertilizer, means connected with the ground wheels for actuating said drive chain, and a lever for lifting the lower stretch of said drive chain from the actuating means.

In testimony whereof I affix my signature in presence of two witnesses.

OLIN LEWIS.

Witnesses:
W. F. BROOKS,
W. F. McNEILL.